US 6,821,087 B2
(12) United States Patent
Matsumoto et al.

(10) Patent No.: US 6,821,087 B2
(45) Date of Patent: Nov. 23, 2004

(54) FLOW-RECTIFYING MEMBER AND ITS UNIT AND METHOD FOR PRODUCING FLOW-RECTIFYING MEMBER

(75) Inventors: Keizo Matsumoto, Saitama-ken (JP); Hiroichi Fukuda, Saitama-ken (JP); Yasuhisa Tateoka, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 142 days.

(21) Appl. No.: 10/347,399

(22) Filed: Jan. 21, 2003

(65) Prior Publication Data

US 2003/0185673 A1 Oct. 2, 2003

(30) Foreign Application Priority Data

Jan. 21, 2002 (JP) ........................................ 2002-011709
Jan. 21, 2002 (JP) ........................................ 2002-011710

(51) Int. Cl.⁷ ............................................... F01D 9/04
(52) U.S. Cl. .................... 415/191; 415/200; 415/208.2; 416/241 A
(58) Field of Search ........................ 29/889.12, 889.22; 415/191, 208.1, 208.2, 211.2; 416/194, 195, 196 R, 204 A, 212 A, 214 A, 229 A, 230, 241 R

(56) References Cited

U.S. PATENT DOCUMENTS 6,196,794 B1 * 3/2001 Matsumoto ................. 415/191

FOREIGN PATENT DOCUMENTS

JP 5-278063 10/1993
JP 11-350904 12/1999

* cited by examiner

Primary Examiner—Edward K. Look
Assistant Examiner—Richard A Edgar
(74) Attorney, Agent, or Firm—Sughrue Mion, PLLC

(57) ABSTRACT

A flow-rectifying member comprising a plurality of vanes, an outer platform and an inner platform for having a flow-rectifying function to a fluid flowing thereinto, which is integrally constituted by annularly connecting a plurality of flow-rectifying member units each having an integral structure comprising a vane, an outer platform piece and an inner platform piece, with the adjacent outer platform pieces connected to each other, and with the adjacent inner platform pieces connected to each other; each flow-rectifying member unit comprising (a) a core comprising a web constituting the vane, and flanges integrally connected to both ends of the web for constituting the outer platform piece and the inner platform piece, and (b) a skin layer covering a surface of the core; and the skin layer being made of a rubber or a thermosetting resin having rubber elasticity.

25 Claims, 11 Drawing Sheets

FLOW-RECTIFYING MEMBER AND ITS UNIT AND METHOD FOR PRODUCING FLOW-RECTIFYING MEMBER

FIELD OF THE INVENTION

The present invention relates to an integrally molded, fiber-reinforced resin unit, a flow-rectifying member constituted by an assembly of such units and a method for producing such a flow-rectifying member, particularly to an I- or C-shaped unit comprising a fiber-reinforced core and a resin skin layer integrally molded therewith, a flow-rectifying member constituted by annularly combining such units, and its production method.

BACKGROUND OF THE INVENTION

Because gas turbine engines not only produce large output but also are extremely efficient, they are widely used for aircraft, electric generators, etc. For instance, gas turbine engines for aircraft are provided with stator vanes acting to guide the introduced air to rotor vanes and working as outlet guide vanes for rectifying a bypass flow. The stator vanes are generally made of metal materials such as titanium alloys, aluminum alloys, stainless steel, etc. The metal stator vanes are produced by forming vanes by casting, forging, pressing, etc., and bonding each vane to a casing called a platform by welding or brazing, etc.

However, the above conventional production methods need machining, finishing, coating, etc. after the formation of vanes, resulting in a large number of working steps and the difficulty of working of small complicated parts. In addition, because they use metal members, the resultant flow-rectifying members are heavy and expensive.

Thus, attention has recently been paid to methods for producing stator vanes by resins or resin composite materials, and several proposals have been made so far. For instance, JP 5-278063A discloses a method for producing vane parts comprising the steps of laminating prepregs to form vane bodies having a smaller size than a desired vane shape; introducing each vane body into a mold to obtain the desired vane shape; and charging a thermoplastic resin into a gap between the vane body and the mold under pressure to carry out compression molding. With stator vanes made of resins, a production period can be shortened with simplified operation and improved shape precision, thereby achieving substantial reduction of cost and weight, etc. However, because resin vane parts are mounted onto platforms by an adhesive or bolts, etc. to produce stator vanes, the stator vanes have many constituent elements, resulting in increase in production steps.

Also, because a thermoplastic resin (polyetheretherketone: PEEK) for a skin layer has as high a melting point as 345° C., it has low flowability in a molten state, resulting in the limitations in a vane design that it is difficult to make the skin layer of the stator vane thinner, and that shrinkage deformation is likely to occur at the time of integral molding. Further, the resin vane parts have insufficient abrasion resistance to sand, etc.

As described in JP 11-350904 A, the conventional flow-rectifying member is produced by bonding units one by one by an adhesive, etc. to assemble a structure, and then fixing the structure by winding tapes, etc. around it. However, such a method cannot provide the flow-rectifying member with a uniform shape without difficulty because of the tolerance of units, resulting in difficulty in fixing at desired positions. In addition, an additional operation of fixing units by winding tapes is needed, and even when one of the units is damaged, the entire flow-rectifying member should be exchanged.

OBJECTS OF THE INVENTION

Accordingly, an object of the present invention is to provide a flow-rectifying member unit having high strength and excellent abrasion resistance with a high degree of freedom in design.

Another object of the present invention is to provide a flow-rectifying member having high strength and excellent abrasion resistance, which is constituted by assembling such units with exchangeability of each unit.

A further object of the present invention is to provide a method for producing such a flow-rectifying member.

DISCLOSURE OF THE INVENTION

As a result of intense research in view of the above objects, the inventors have found that (a) by forming an I- or C-shaped unit for constituting a flow-rectifying member by integrally molding a rubber or a thermosetting resin having rubber elasticity around its core, and by combining these flow-rectifying member units annularly, it is possible to easily produce a flow-rectifying member having high strength, excellent abrasion resistance and a uniform shape with exchangeability of each unit, and that (b) by connecting the outer and inner platform pieces of the above units respectively to those of the adjacent units to form a temporary assembly, and by fixing it to support members and fixing members, it is possible to easily produce a flow-rectifying member. The present invention has been completed based on these findings.

The flow-rectifying member unit of the present invention used for assembling a flow-rectifying member comprising a plurality of vanes, an outer platform and an inner platform has an integral structure comprising a vane, an outer platform piece and an inner platform piece, the unit being constituted by (a) a core comprising a web constituting the vane, and flanges integrally connected to both ends of the web for constituting the outer platform piece and the inner platform piece, and (b) a skin layer covering a surface of the core; and the skin layer being made of a rubber or a thermosetting resin having rubber elasticity.

The flow-rectifying member of the present invention comprises a plurality of vanes, an outer platform and an inner platform for having a flow-rectifying function to a fluid flowing thereinto, which is integrally constituted by annularly connecting a plurality of flow-rectifying member units each having an integral structure comprising a vane, an outer platform piece and an inner platform piece, with the adjacent outer platform pieces connected to each other, and with the adjacent inner platform pieces connected to each other; each flow-rectifying member unit comprising (a) a core comprising a web constituting the vane, and flanges integrally connected to both ends of the web for constituting the outer platform piece and the inner platform piece, and (b) a skin layer covering a surface of the core; and the skin layer being made of a rubber or a thermosetting resin having rubber elasticity.

The method of the present invention for producing a flow-rectifying member comprises the steps of (1) forming a core comprising a vane, an outer platform piece and an inner platform piece by integrally connecting flanges to both ends of a web constituting the vane, and integrally molding a skin layer made of a rubber or a thermosetting resin having rubber elasticity to a surface of the core, thereby forming a flow-rectifying member unit; (2) connecting the outer platform pieces of the adjacent units to each other, and connecting inner platform pieces of the adjacent units to each other, thereby forming an annular temporary assembly; (3) mounting the outer and inner platforms of the temporary assembly onto outer and inner circular support members, respectively; and (4) fixing outer and inner fixing members respectively to the outer and inner circular support members, thereby fixing the temporary assembly to the outer and inner fixing members.

The rubber or the thermosetting resin having rubber elasticity is preferably a thermosetting urethane rubber, and the core is constituted by a laminate of fiber-reinforced prepregs or a light metal. The flanges are preferably formed by bending both end portions of the laminate of the fiber-reinforced prepregs. The fiber-reinforced prepregs are preferably carbon-fiber-reinforced polyetheretherketone or a carbon-fiber-reinforced epoxy resin, and the light metals are preferably aluminum alloys or magnesium alloys.

Each of the outer platform piece and the inner platform piece has connecting step portions at both ends, and the step portions of the adjacent units have shapes complementary to each other.

The unit according to a preferred embodiment of the present invention comprises flanges obtained by dividing both end portions of the laminate of the fiber-reinforced prepregs to two and bending them in a T shape, whereby a core has a substantially I shape. The unit according to another preferred embodiment of the present invention comprises flanges obtained by bending both end portions of the laminate of the fiber-reinforced prepregs in the same direction, whereby a core has a substantially C shape.

The adjacent outer platform pieces are overlapping each other via their connecting step portions, and the adjacent inner platform pieces are overlapping each other via their connecting step portions.

The outer and inner platforms are preferably fixed by outer and inner circular support members and outer and inner fixing members, respectively. Each of the outer, circular support member and the inner circular support member preferably comprises a receiving portion having a width equal to or slightly smaller than the thickness of one end portion of each of the outer platform and the inner platform, whereby one end portion of each of the outer platform and the inner platform is press-fitted into the receiving portion of each of the outer, circular support member and the inner circular support member.

The outer fixing member and/or the inner fixing member is annular and has stoppers projecting from one surface thereof, and the stoppers are caused to engage notches of the outer platform and/or the inner platform of the temporary assembly to fix the temporary assembly at a predetermined position.

In a preferred embodiment, the outer and inner platform pieces respectively have connecting step portions at both ends, the step portions being overlapping with the complementarily shaped step portions of the adjacent units, whereby the outer platform pieces are connected to each other, and the inner platform pieces are connected to each other, both by an elastic function of the rubber or the thermosetting resin having rubber elasticity.

The outer, circular support member preferably has, on an inner surface, a receiving portion, to which an outer platform of the temporary assembly is mounted.

The flow-rectifying member of the present invention is preferably a stator vane assembly of a gas turbine.

BRIEF DESCRIPTION OF THE DRAWINGS

FIG. 2 (b) is a front view of the I-shaped unit of FIG. 2 (a);

DESCRIPTION OF THE PREFERRED EMBODIMENTS

[1] Flow-Rectifying Member Unit

The flow-rectifying member (stator vane assembly) unit of the present invention, which has a basic structure comprising a vane, an outer platform piece, and an inner platform piece, may be classified into an I-shaped unit, a C-shaped unit, etc. depending on the shapes of flanges integrally connected to both ends of a web constituting the vane. The I-shaped unit and the C-shaped unit will be explained below in detail.

(1) I-Shaped Unit

Figure 1:
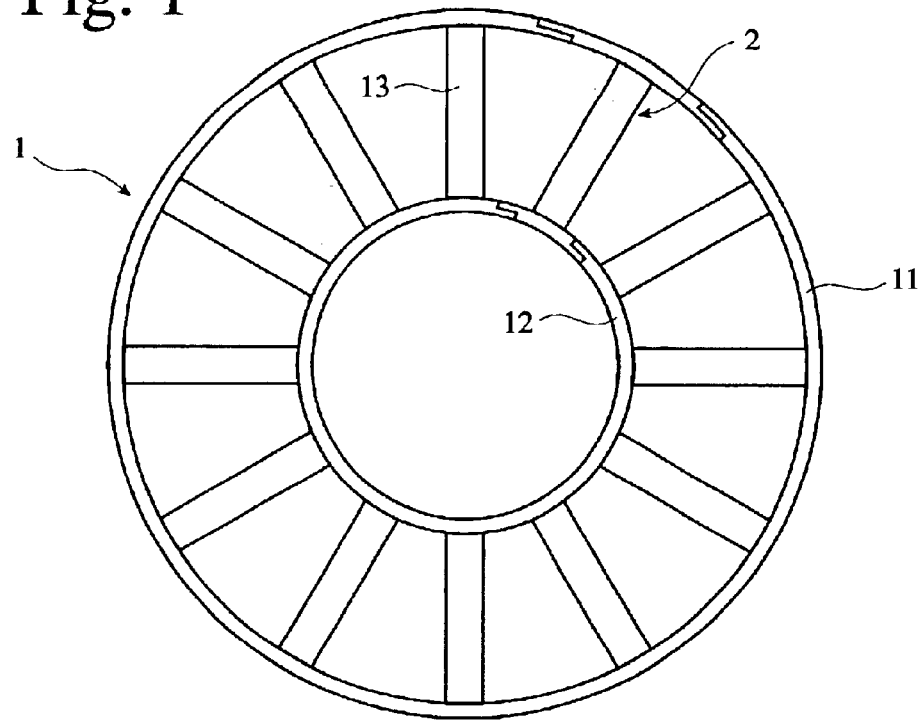
FIG. 1 is a front view showing one example of the flow-rectifying member of the present invention constituted by I-shaped units.
Figure 2A:
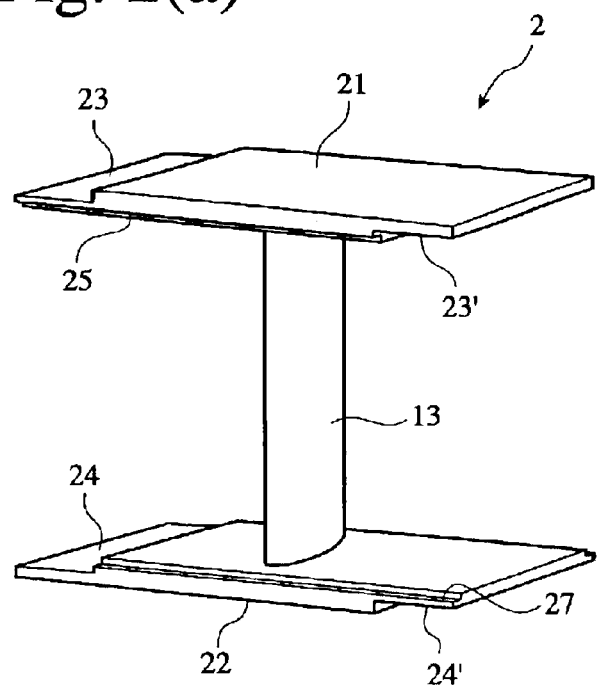
FIG. 2 (a) is a schematic perspective view showing one example of an I-shaped unit constituting the flow-rectifying member of the present invention.

As one example of the flow-rectifying member constituted by the I-shaped units of the present invention, FIG. 1 shows a gas turbine stator vane assembly 1. The gas turbine stator vane assembly 1 comprises an outer platform 11, an inner platform 12, and a plurality of vanes 13 fixed to both platforms 11, 12 at an equal interval, and each I-shaped unit 2 constituting the gas turbine stator vane assembly 1 has a shape obtained by dividing the stator vane assembly 1 by the number of vanes. As shown in FIGS. 2 (a) and (b), each unit 2 has a vane 13, an outer platform piece 21, and an inner platform piece 22 in the form of a substantially I-shaped, integral molding body as a whole. Incidentally, though both platform pieces 21, 22 are depicted flat in FIGS. 2 (a) and (b) for simplicity, they are actually in a shape of a circular arc.

Figure 2B:
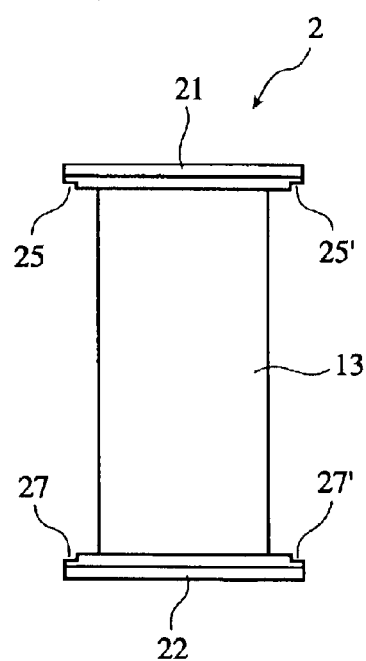

The outer platform piece 21 formed in a circular arc shape is provided with step portions 23, 23' at both ends in a circular direction, and the inner platform piece 22 formed in a circular arc shape is provided with step portions 24, 24' at both ends in a circular direction. Further, as shown in FIG. 2(b), the outer platform piece 21 is provided with projections 25, 25' at both ends in an axial direction, and the inner platform piece 22 is provided with projections 27, 27' at both ends in an axial direction. Because the step portions 23, 23' and 24, 24' of the platform pieces 21, 22 in the adjacent I-shaped units 2 have complementary shapes, the I-shaped units 2 are fitted to each other as shown in FIG. 1.

Figure 3:
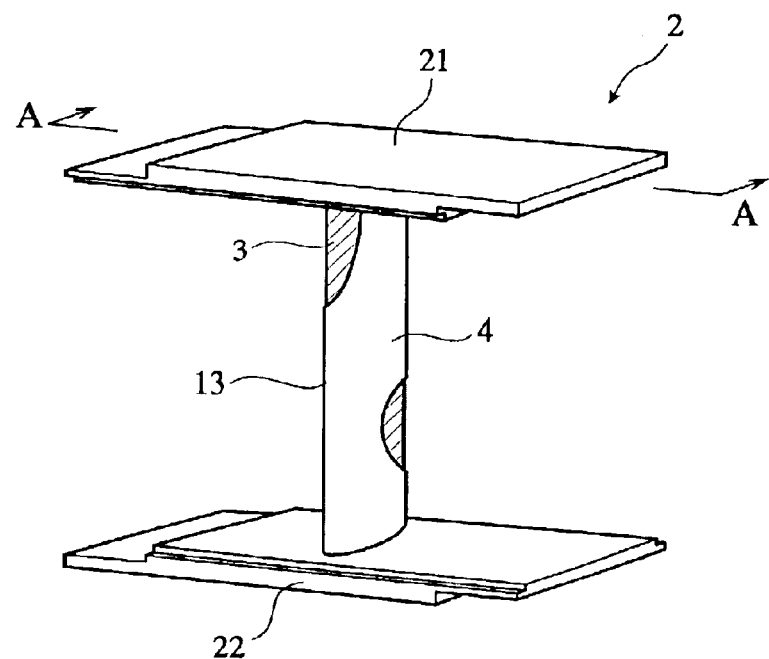
FIG. 3 is a partially broken perspective view showing the structure of the I-shaped unit of the present invention.

As shown in FIG. 3, each I-shaped unit 2 is constituted by a substantially I-shaped core 3, and a skin layer 4 integrally molding on the core 3. The skin layer 4 covers a surface of the outer platform piece 21, a surface of the inner platform piece 22 and a surface of the vane 13.

The core 3 is preferably constituted by a laminate of fiber-reinforced prepregs or a light metal. The fiber-reinforced prepregs are reinforcing fibers such as carbon fibers, aramide fibers, glass fibers, boron fibers, etc. impregnated with matrix resins such as thermoplastic or thermosetting resins. The average diameter of the reinforcing fibers is preferably about 3–200 $\mu$m. The thermoplastic resins may be polyetheretherketones (PEEK), polyamides such as nylons, polyimides, polyesters such as polyethylene terephthalate and polybutylene terephthalate, polyacetals, polyphenylene sulfides, polyetherketones, etc. The thermosetting resins may be epoxy resins, polyurethane, unsaturated polyesters, etc. The fiber-reinforced prepregs are preferably carbon fiber composite materials composed of carbon fibers and the above resins, specifically, combinations of carbon fibers and PEEK or combinations of carbon fibers and epoxy resins from the viewpoint of mechanical strength and heat resistance. Commercially available carbon fiber-reinforced PEEK is APC-2 available from CYTEC FIBERITE, etc. The light metals are preferably aluminum alloys such as Al—Mg, Al—Mn, Al—Mg—Si, Al—Cu, Al—Cu—Si, Al—Cu—Mg—Ni, etc.; magnesium alloys such as Mg—Zn, Mg-rare earth elements, etc.

Figure 4:
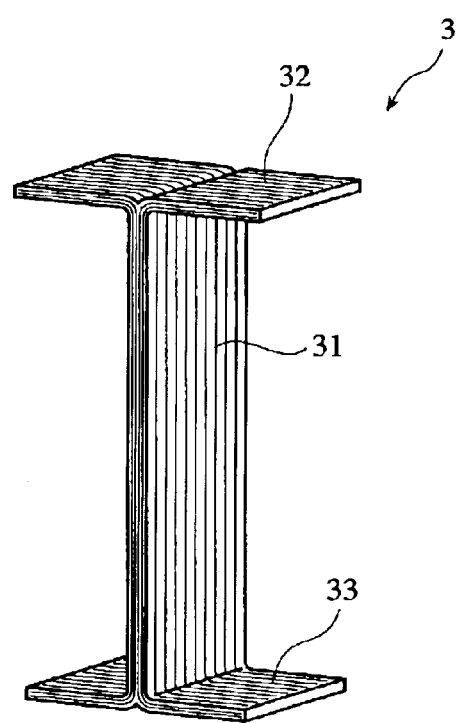
FIG. 4 is a perspective view showing one example of a core of the I-shaped unit of the present invention.

FIG. 4 shows a core 3 constituted by fiber-reinforced prepregs. The core 3 is constituted by a web 31 constituting a vane 13, a flange 32 constituting an outer platform piece 21, and a flange 33 constituting an inner platform piece 22. The web 31 is integral with the flanges 32, 33, and each flange 32, 33 is in a shape obtained by dividing both end portions of the laminated fiber-reinforced prepregs to half, and bending them to both sides.

Figure 5:
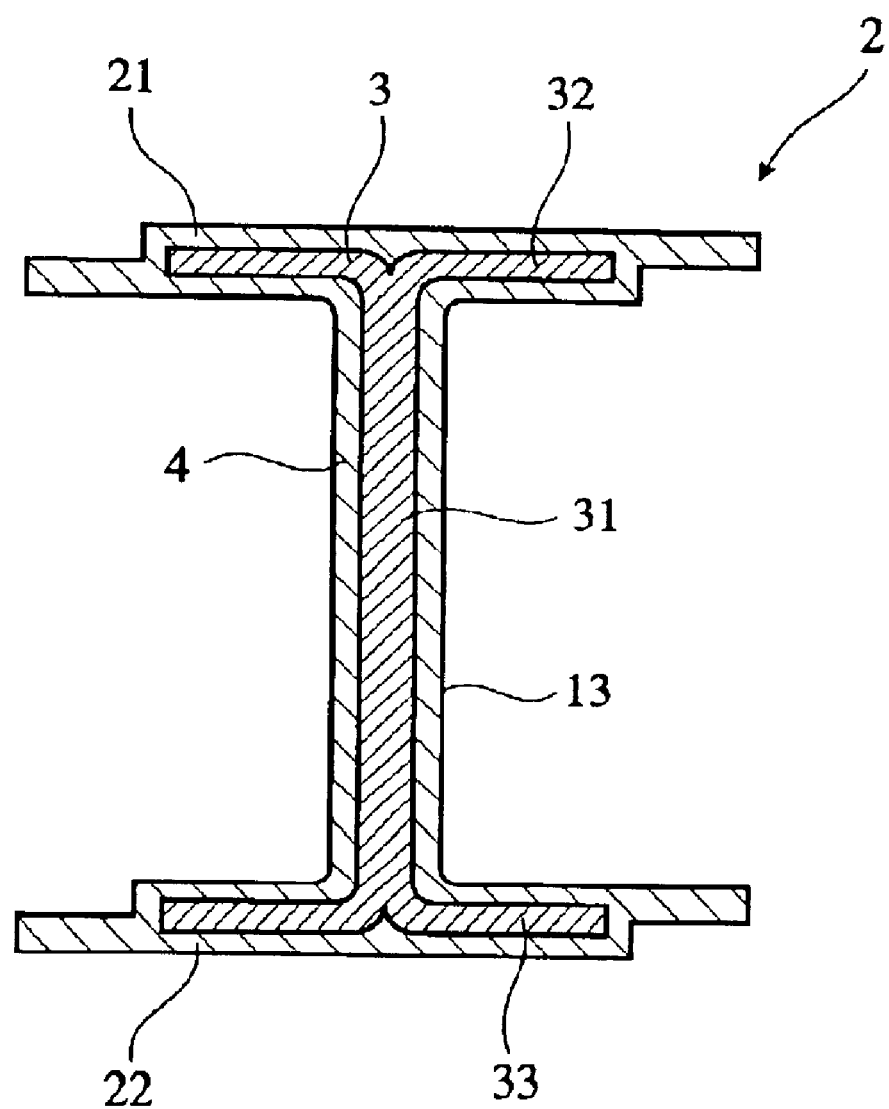
FIG. 5 is a cross-sectional view taken along the line A—A in the I-shaped unit in FIG. 3.

As shown in FIG. 5, the I-shaped unit is constituted by an integrally molded core 3 comprising an outer platform piece 21, an inner platform piece 22 and a vane 13, and a skin layer 4 covering the core 3.

Materials forming the skin layer 4 are preferably rubbers or thermosetting resins having rubber elasticity from the viewpoint of abrasion resistance to sand, hail, etc. Specifically, urethane rubbers, silicone rubbers, chloroprene and other rubber materials are preferable, and the urethane rubbers are more preferable. Preferred examples of the urethane rubbers include, for instance, injection-molding-type urethane rubbers obtained by the reaction of polyol prepolymers such as polyether polyol prepolymers and toluene diisocyanate (TDI) or 4,4'-methylene-bis (phenyl isocyanate) (MDI). These materials are preferably injected into a die cavity in a mixed state.

Because the thermosetting resins have low viscosity in a liquid state, they can be injection-molded to a thin skin layer. Because the vane shape is important to a flow-rectifying function, the thin skin layer can increase the degree of freedom in a vane design. Because the thermoplastic resin enables molding at low temperatures (about 100° C. or lower), the reduction of core rigidity by heat can be suppressed, resulting in decreased dimension errors due to heat shrinkage. It is thus possible to produce the units with high dimension accuracy. When urethane rubbers, etc. having self-adhesion are used as the rubbers or the thermosetting resins having rubber elasticity, improved adhesion to the core can be achieved. This makes it possible to use various fiber-reinforced prepregs and light metals for the cores, resulting in wider selection of materials.

(2) C-Shaped Unit

Figure 6A:
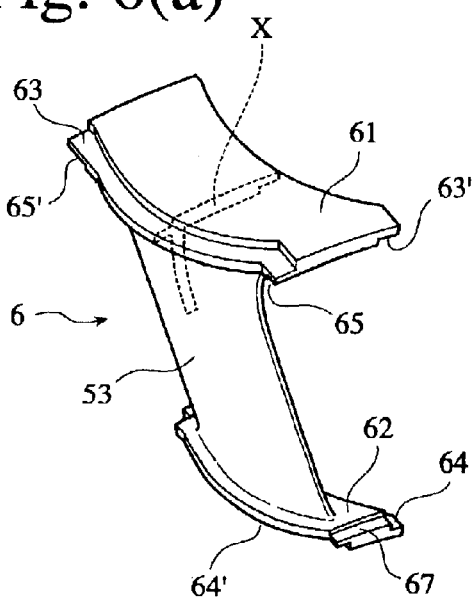
FIG. 6(a) is a perspective view showing one example of the C-shaped unit of the present invention.
Figure 6B:
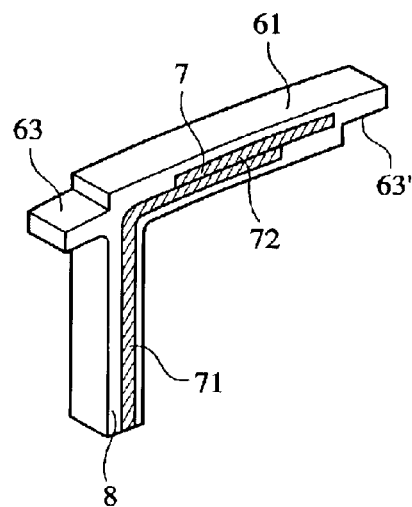
FIG. 6(b) is an enlarged perspective view showing a portion X of the C-shaped unit in FIG. 6(a)
Figure 7:
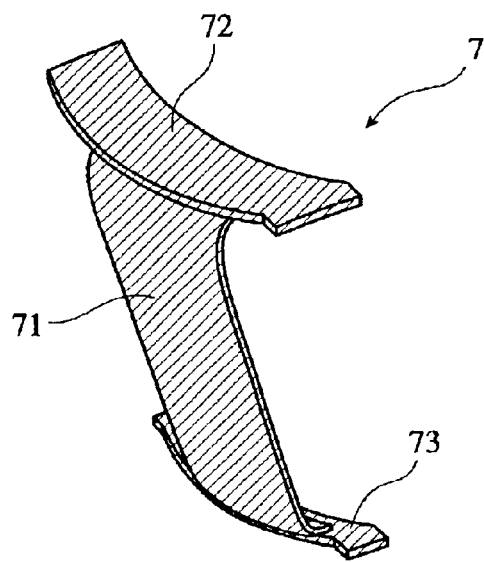
FIG. 7 is a perspective view showing one example of the core of the C-shaped unit of the present invention.

FIG. 6(a) shows a C-shaped unit, and FIG. 6(b) shows its portion X. Each C-shaped unit 6 is constituted by a substantially C-shaped core 7, and a skin layer 8 integrally molded on the core 7. As shown in FIG. 7, the C-shaped core 7 comprises a web 71 constituting a vane, a flange 72 constituting an outer platform piece 61, and a flange 73 constituting an inner platform piece 62. The web 71 is integral with the flanges 72, 73, and each flange 72, 73 is in a shape obtained by bending both end portions of a fiber-reinforced prepreg laminate to the same side.

As shown in FIGS. 6(a) and 6(b), the C-shaped unit is constituted by an integrally molded, C-shaped core 7 comprising an outer platform piece 61, an inner platform piece 62 and a vane 53, and a skin layer 8 covering the C-shaped core 7.

Figure 6C:
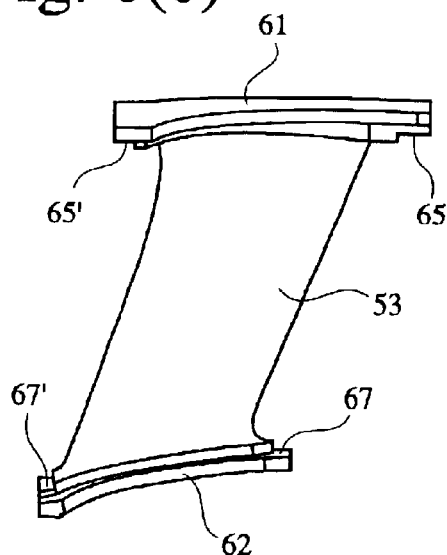
FIG. 6(c) is a front view showing the C-shaped unit of FIG. 6(a)
Figure 6D:
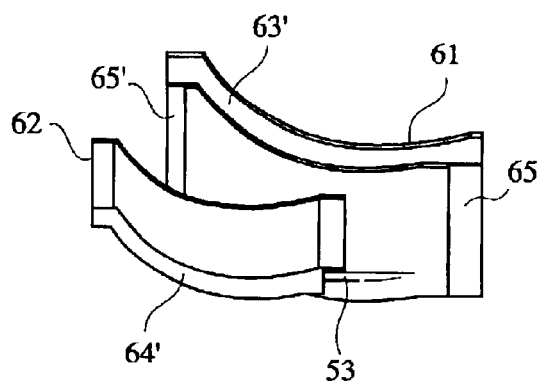
FIG. 6(d) is a bottom view showing the C-shaped unit of FIG. 6(a)
Figure 8:
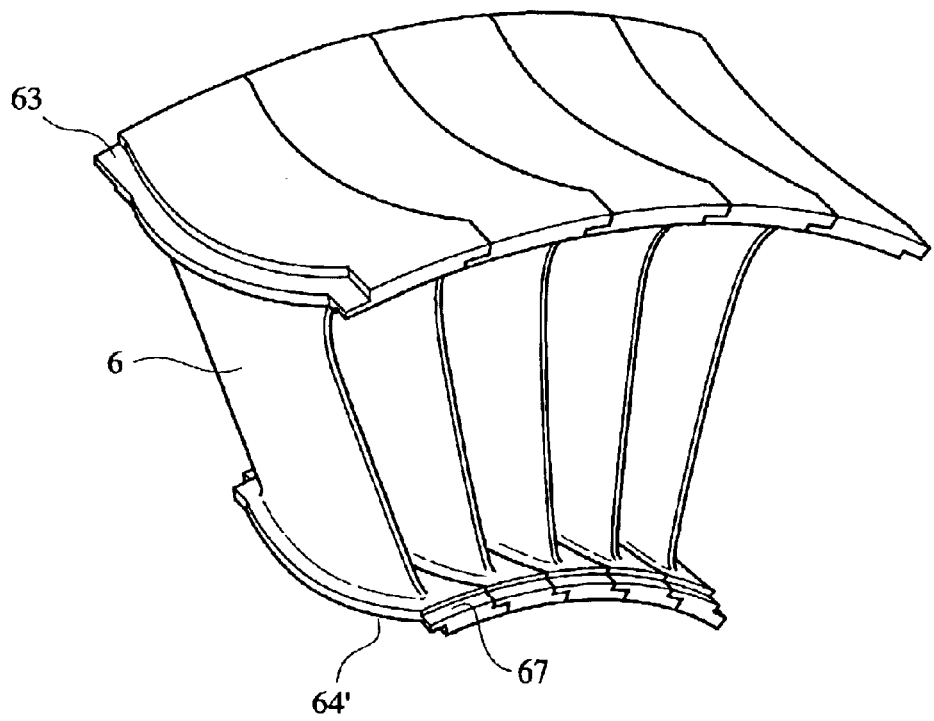
FIG. 8 is a perspective view showing an assembly of a plurality of C-shaped units.

FIG. 6(c) is a front view showing the C-shaped unit, and FIG. 6(d) is its bottom view. Like the I-shaped unit, the outer platform piece 61 formed in a circular arc shape is provided with step portions 63, 63' at both ends in a circular direction, and the inner platform piece 62 formed in a circular arc shape is provided with step portions 64, 64' at both ends in a circular direction. The outer platform piece 61 is also provided with projections 65, 65' at both ends in an axial direction, and the inner platform piece 62 is also provided with projections 67, 67' at both ends in an axial direction. Because the step portions 63, 63' and 64, 64' of the platform pieces 61, 62 of the adjacent C-shaped units 6 have complementary shapes, the C-shaped units 6 are fitted to each other as shown in FIG. 8. The flow-rectifying member is constituted by annularly combining the C-shaped units 6 as shown in FIG. 8.

Materials forming the C-shaped core 7 and resins forming the skin layer 8 may be the same as in the I-shaped unit.

Figure 6E:
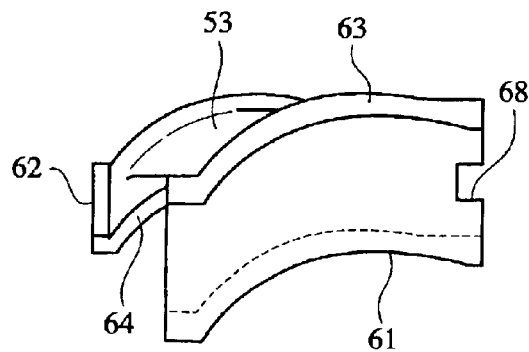
FIG. 6(e) is a plan view showing a C-shaped unit provided with a notch.

In any case where the flow-rectifying member unit is I-shaped or C-shaped, a unit comprising an outer platform piece having a notch 68 in a center portion at one end as shown in FIG. 6(e) may properly be combined with a notch-free unit. The notch 68 is caused to engage the stopper of the outer fixing member at the time of assembling the flow-rectifying member, thereby preventing the rotation of the flow-rectifying member. Incidentally, the notch 68 may be provided on the outer platform piece, the inner platform piece or both. In any event, the notch 68 may engage the outer fixing member and/or the inner fixing member.

[2] Method for Producing Unit

The flow-rectifying member of the present invention may basically be produced by the same method, in any case where the unit is I-shaped or C-shaped. Accordingly, explanation will be made on the C-shaped unit here.

First, the flanges are integrally connected to both ends of the web constituting the vane to form a core comprising a vane, an outer platform piece and an inner platform piece. The flanges are formed by bending both end portions of the laminate of the fiber-reinforced prepregs constituting a core.

As a method for forming a core, explanation will be made on a case where a carbon-fiber-reinforced PEEK formed by impregnating carbon fibers arranged in one direction with PEEK is used. A plurality of carbon-fiber-reinforced PEEK sheets cut in a proper shape are laminated such that carbon fibers are arranged along the longitudinal direction of the vane 53 (radial direction of the gas turbine stator vane assembly), set in a die for molding a C-shaped core, and thermally pressed. The thermal pressing is carried out, for instance, by heating the die at about 300° C. to form a preform, and then pressing the preform while heating. A core-molding die cavity is smaller than the size of the vane 53 by about 0.1–2 mm with the same shape as that of the vane 53. The heating temperature of this core-molding die is a temperature, at which PEEK is melted and fluidized, preferably about 400° C. The molding pressure is preferably 3–25 kgf/cm², more preferably about 15 kgf/cm².

With the molded core 7 covered with a skin layer made of a rubber or a thermosetting resin having rubber elasticity 8, the flow-rectifying member unit is integrally molded. First, the molded core 7 is placed in an injection-molding die. The cavity of the injection-molding die has the same shape as the final shape of a vane. In the case of using a thermosetting urethane rubber as a rubber or a thermosetting resin having rubber elasticity, the die temperature is set at a temperature not needing control, preferably at a temperature between room temperature (25° C.) and 150° C., for instance, about 40° C., and two solutions for the urethane rubber, for instance, an MDI solution and a polyether polyol solution, are mixed and then injected into a gap between a die cavity and the core 7 placed in the die cavity in advance. The injected mixture is kept for 5–300 minutes, for instance, 60 minutes, for primary curing.

The primarily cured unit was taken out of the die and kept at a temperature of 25° C. to 150° C., for instance, at 70° C., for 24 hours or less, for instance, 10 hours, in a heating furnace for further curing (secondary curing). This accelerates the cross-linking reaction of polyurethane, whereby a skin layer 8 made of a thermosetting urethane rubber having a thickness of about 0.1 mm to 2 mm is formed on the core 7. The molded C-shaped unit 6 has platform pieces 61, 62 with its entire core 7 covered with a resin.

[3] Flow-Rectifying Member and its Production Method

Taking a gas turbine stator vane assembly as an example, the constitution of the flow-rectifying member and its production method will be explained below. Because there is basically no difference in any case where the units constituting the gas turbine stator vane assembly is I-shaped or C-shaped, the gas turbine stator vane assembly constituted by the C-shaped units will be explained here.

The platform pieces 61, 62 of a plurality of the adjacent C-shaped units 6 are annularly combined to form a temporary assembly. As shown in FIGS. 6(*a*)–(*d*), an outer surface portion of the annular temporary assembly is constituted by the outer platform, which are connected to each other via their complementary step portions. An inner surface portion of the annular temporary assembly is constituted by the inner platforms, which are connected to each other via their complementary step portions. The connecting step portions 63, 63' and 64, 64' of the C-shaped unit are formed by a rubber or a thermosetting resin having rubber elasticity.

Accordingly, the adjacent C-shaped units 6 are annularly assembled, with the step portions 63, 63' having complementary shapes overlapped, and with the step portions 64, 64' having complementary shapes overlapped. There is repulsion between the overlapped step portions 63, 63' and between the overlapped step portions 64, 64' by the elastic function of a rubber or a thermosetting resin having rubber elasticity, whereby the units are not detached with a small force. Accordingly, there is no need of fixing the units by an adhesive, etc. at the time of connecting them. Because there is no need of fixing the units being assembled, by winding a tape around an outer surface of the outer platform 11 constituted by the outer platform pieces 61, 61 . . . and an inner surface of the inner platform 12 constituted by the inner platform pieces 62, 62 . . . , and fusing the tapes to the assembled units, the number of working steps can be reduced, and the flow-rectifying member can be provided with decreased weight.

The temporary assembly thus produced has such strength that it can be handled. The outer and inner platforms of this temporary assembly are mounted onto support members, and the temporary assembly is fixed to fixing members. Usable as the support members are, for instance, an inner circular support member 80 and an outer, circular support member 90 shown in FIGS. 9 and 10.

The inner circular support member 80 comprises a cylinder portion 83 that can be fitted inside the temporary assembly, and flanges 82, 84 formed on the cylinder portion 83 at both ends. The flange 82 at one end is provided with an annular recess (receiving portion) 87 having a width equal to or slightly smaller than the thickness of one end portion 17 of the inner platform. The flange (inward flange) 84 at the other end is provided with a plurality of screw holes 81. The outer, circular support member 90 constitutes a fan casing for the gas turbine engine.

The outer, circular support member 90 comprises a cylinder portion 93 for receiving the temporary assembly and flanges formed at both ends thereof. The cylinder portion 93 is provided on an inner surface with an annular recess (receiving portion) 95 having a width equal to or slightly smaller than the thickness of one end portion 15 of the outer platform. The flange 92 on the side of inserting the temporary assembly is provided with a plurality of screw holes 91. An inner, annular fixing member 86 engaging the inner circular support member 80 is provided with an annular recess (receiving portion) 87' having a width equal to or slightly smaller than the thickness of one end 17' of the inner platform, and a plurality of screw holes 81'. An annular, outer fixing member 96 engaging the outer, circular support member 90 is provided with a plurality of screw holes 91' and a plurality of stopper holes 97'.

Figure 9:
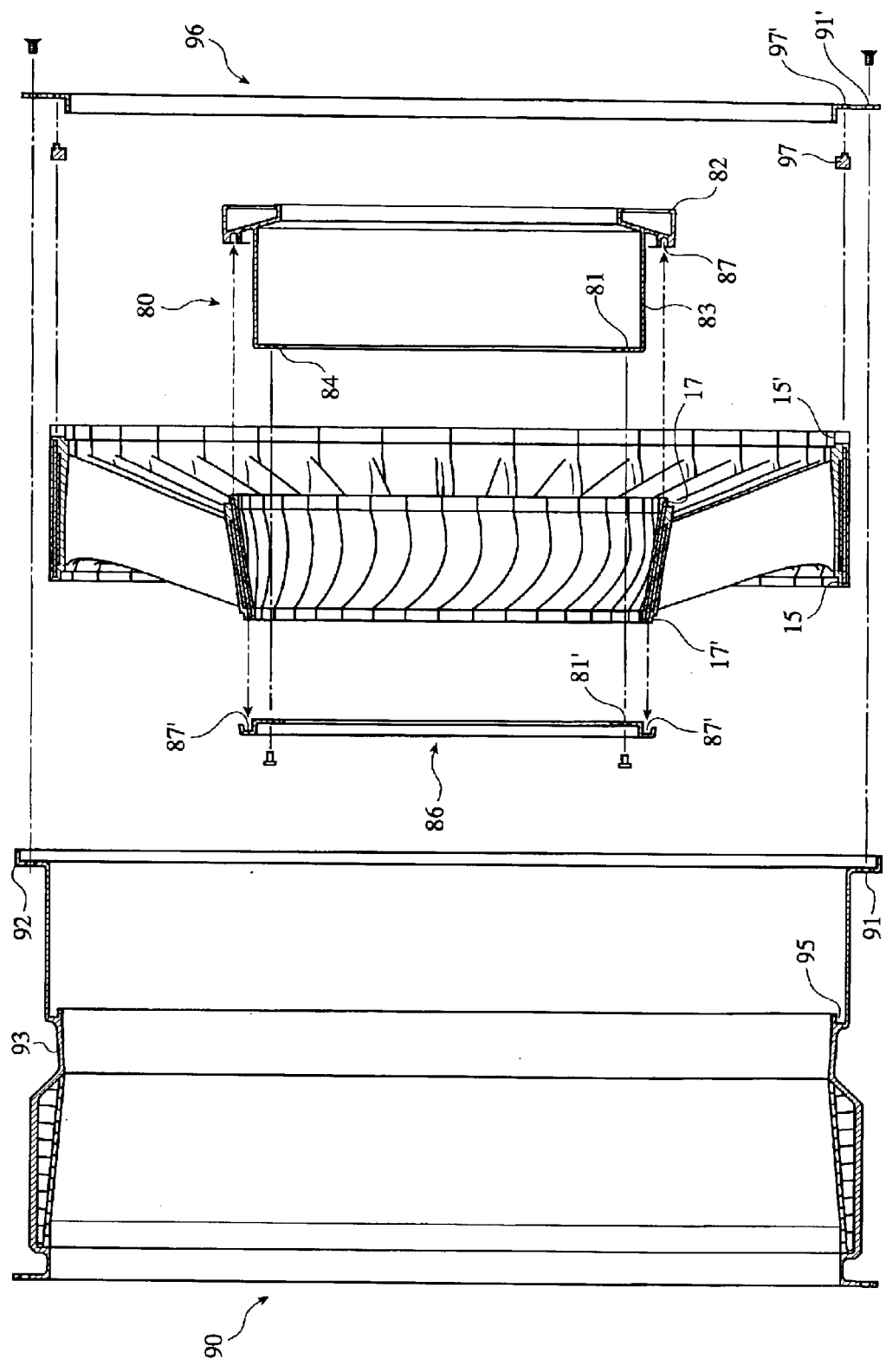
FIG. 9 is a cross-sectional view showing a temporary assembly of the flow-rectifying member units of the present invention before mounted to an inner circular support member and an outer, circular support member.
Figure 10:
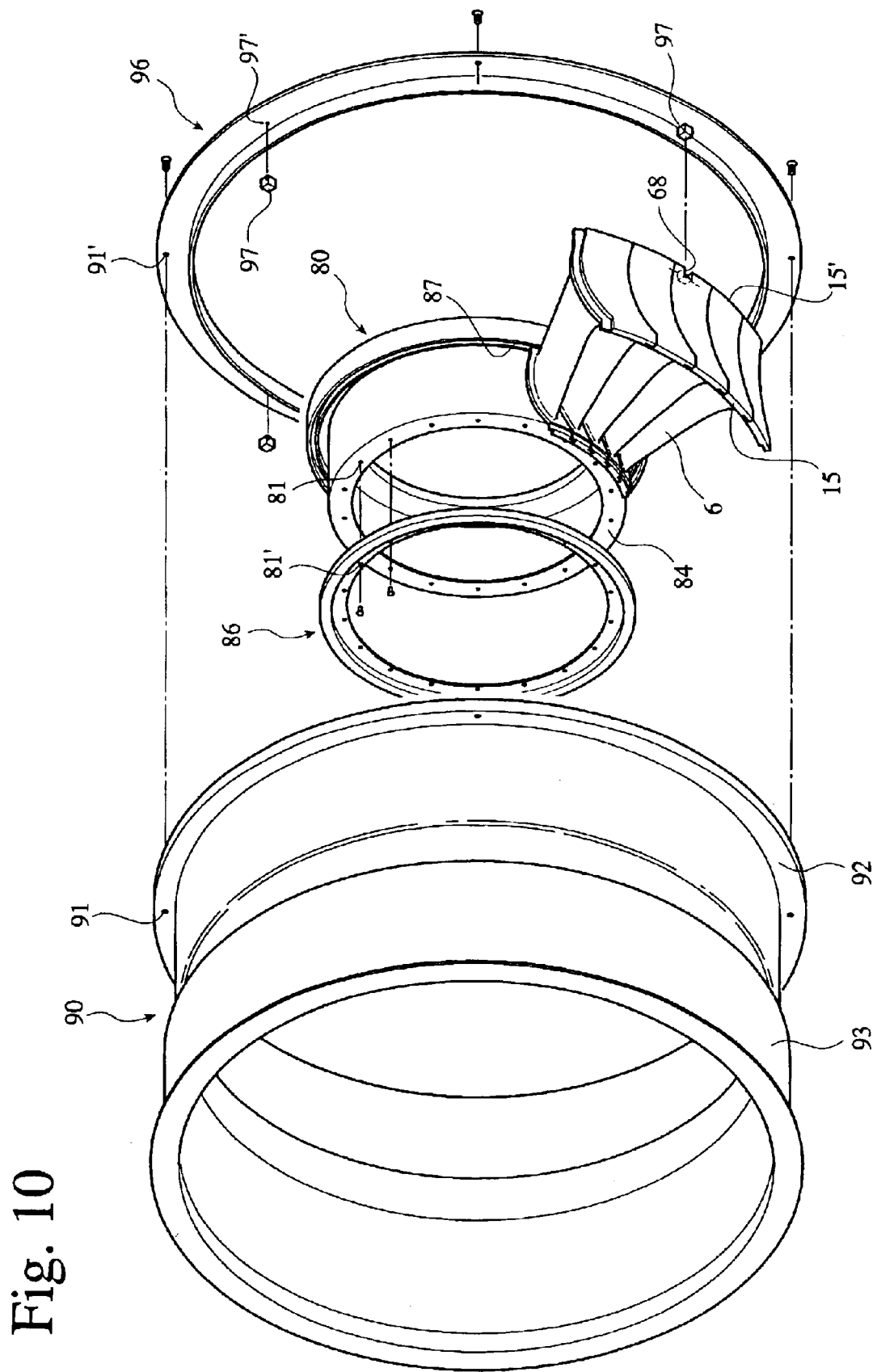
FIG. 10 is a perspective view showing a temporary assembly of the flow-rectifying member units of the present invention mounted to an inner circular support member and an outer, circular support member.
Figure 11:
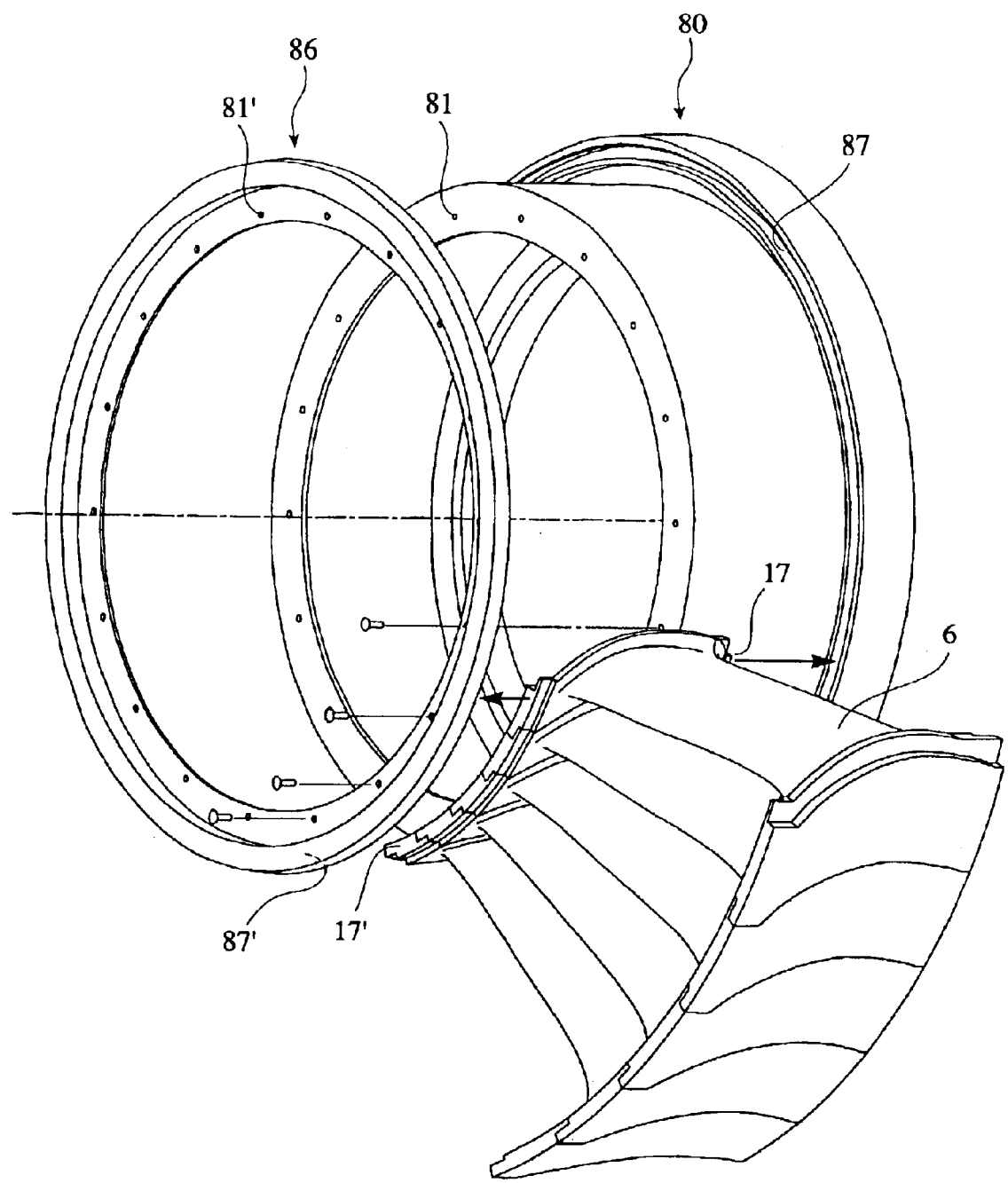
FIG. 11 is a perspective view showing a temporary assembly whose inner platform is fixed to an inner circular support member and an inner fixing member.

As shown in FIG. 11, the one end portion (projection) 17 of the inner platform of the temporary assembly is press-fitted into the annular recess (receiving portion) 87 of the inner circular support member 80, and the other end portion (projection) 17' of the inner platform is then press-fitted into the annular recess (receiving portion) 87' of the fixing member 86. Thereafter, the inner fixing member 86 is fixed by screws to the inner circular support member 80. As shown in FIGS. 9 and 10, the temporary assembly having the inner platform fixed by the inner circular support member 80 and the inner fixing member 86 is inserted into the outer, circular support member 90, and the projection 15 of the outer platform of the temporary assembly is press-fitted into the annular recess (receiving portion) 95 formed on the inner surface of the outer, circular support member 90.

Figure 12:
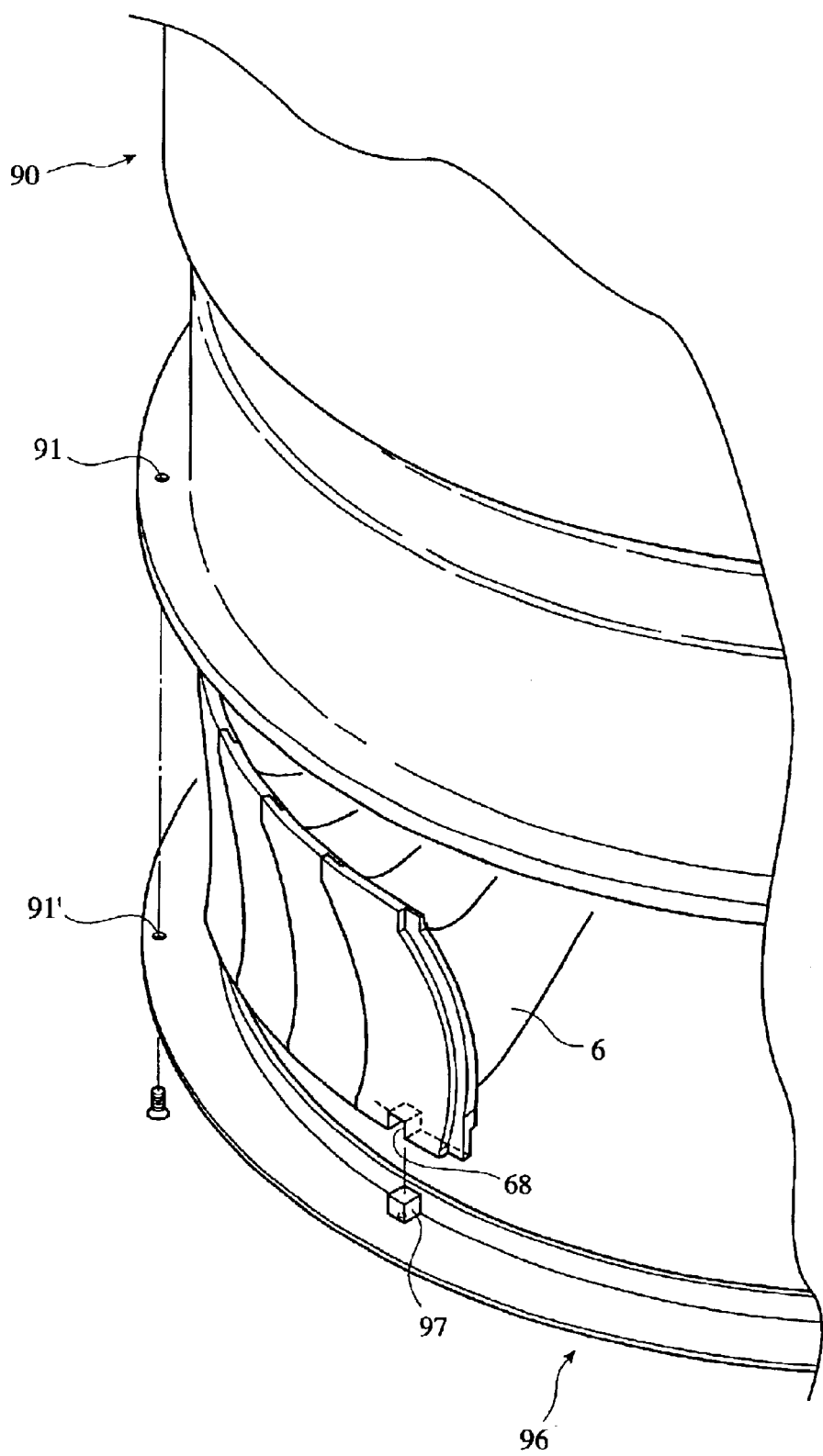
FIG. 12 is a partial perspective view showing a temporary assembly whose outer platform is fixed to an outer, circular support member and an outer fixing member.

After abutting the annular, outer fixing member 96 to the projection 15' of the outer platform at the other end, the flange 92 of the outer, circular support member 90 is fixed by screws to the outer fixing member 96. Stoppers 97 are inserted into at least two, preferably 3 to 4, stopper holes 97' of the outer fixing member 96 as shown in FIG. 12, such that the stator vane assembly does not rotate, and the stoppers 97 are caused to engage notches 68 of the outer platform to achieve the positioning of the stator vane assembly.

Figure 13:
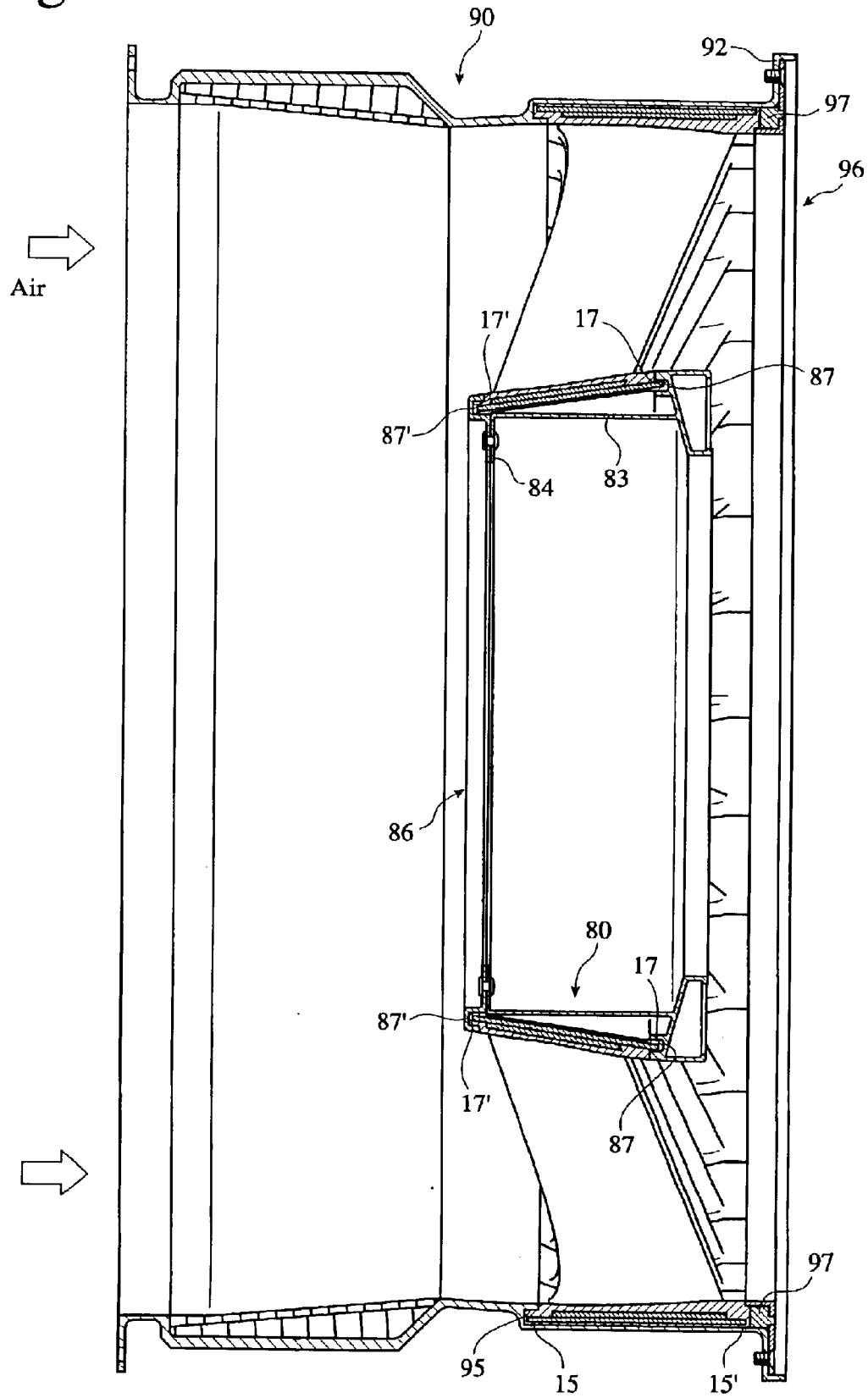
FIG. 13 is a vertical cross-sectional view showing one example of the flow-rectifying member of the present invention mounted to the inner circular support member and the outer, circular support member.

FIG. 13 shows a stator vane assembly fixed by the inner circular support member 80, the outer, circular support member 90, the inner fixing member 86, and the outer fixing member 96. The projections 17, 17' of the inner platform of the stator vane assembly at both ends are press-fitted into the annular recesses (receiving portions) 87, 87' of the inner circular support member 80 and the inner fixing member 86. The projection 15 of the outer platform of the stator vane assembly at one end is press-fitted into the annular recess (receiving portion) 95 of the outer, circular support member 90, whereby the projection 15' of the outer platform at the other end abuts the outer fixing member 96 to achieve the positioning of the stator vane assembly by the stoppers 97. Also, the flange 92 of the outer, circular support member 90 is fixed by screws to the outer fixing member 96, and the flange 84 of the inner circular support member 80 is fixed by screws to the inner fixing member 86.

Either an I-shaped unit or a C-shaped unit can be mounted to support members equally. The support members may be made of metals or plastics as long as they have an integral shape.

Figure 14:
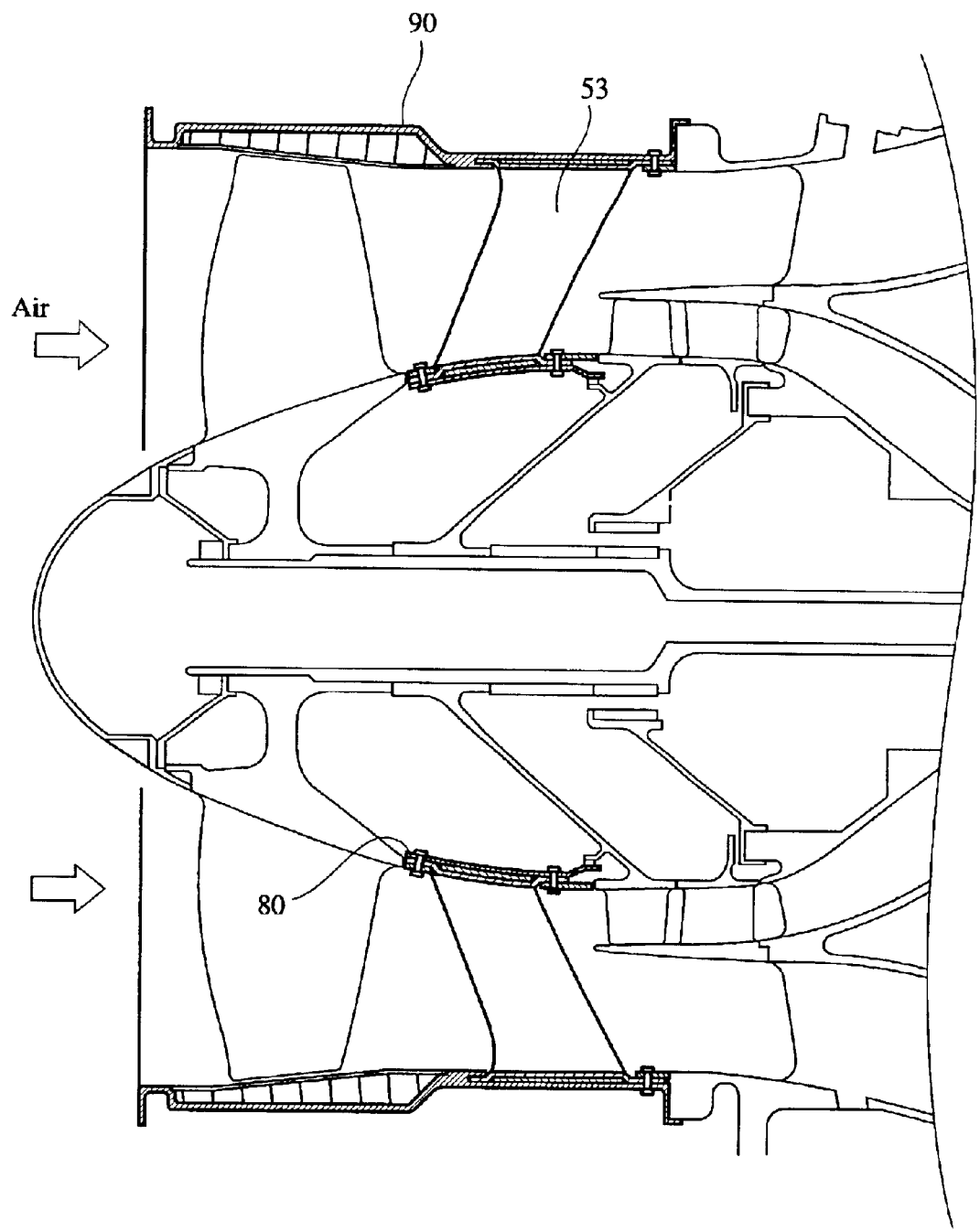
FIG. 14 is a vertical cross-sectional view showing another example of the flow-rectifying member of the present invention mounted to a gas turbine engine.

FIG. 14 shows another example of the mounting of a stator vane assembly to a gas turbine engine. In this example, the outer platform of the stator vane assembly is mounted onto an engine member. When the engine members are used as an outer, circular support member and an inner circular support member, various supporting methods can be utilized by an engine structure, into which parts of the stator vane assembly such as a fan casing, an intermediate casing, etc., can be incorporated. Also, by using the engine members for such support members, it is possible to reduce the number of parts.

Though the present invention has specifically been explained referring to the attached drawings, the present invention is not restricted thereto, and various modifications can be made unless deviating from the spirit of the present invention. For instance, the shape, materials, molding conditions, etc. of each unit may be modified.

As described above, because an I- or C-shaped unit constituted by a core and a skin layer integrally injection-molded around the core is produced in the present invention, it is possible to achieve extremely strong fixing of vanes to platforms. Also, because the skin layer is formed by a rubber or a thermosetting resin having rubber elasticity, the unit is excellent in abrasion resistance and can be formed at low temperatures. Therefore, the unit has small heat shrinkage and high dimension accuracy.

The flow-rectifying member of the present invention has a uniform shape, because it is produced by annularly combining the flow-rectifying member units by utilizing the elastic function of a rubber or a thermosetting resin having rubber elasticity to constitute a temporary assembly, and mounting the temporary assembly to the support members. Also, because the units are not fixed, only a damaged unit can be exchanged. In addition, because a thermosetting resin has so low a melt viscosity that it can produce a thin skin layer, there is a large degree of freedom in vane design, resulting in providing the flow-rectifying member with good dimension accuracy.

As described above, because the winding of tapes is not needed in the assembling of the flow-rectifying member in the present invention, the flow-rectifying member can be reduced in weight, and the total number of working steps can be reduced, resulting in the reduction of production cost.

What is claimed is:

1. A flow-rectifying member unit used for assembling a flow-rectifying member comprising a plurality of vanes, an outer platform and an inner platform; said unit having an integral structure comprising a vane, an outer platform piece and an inner platform piece; said unit being constituted by (a) a core comprising a web constituting said vane, and flanges integrally connected to both ends of said web for constituting said outer platform piece and said inner platform piece, and (b) a skin layer covering a surface of said core; and said skin layer being made of a rubber or a thermosetting resin having rubber elasticity.

2. The flow-rectifying member unit according to claim 1, wherein said rubber or said thermosetting resin having rubber elasticity is a thermosetting urethane rubber.

3. The flow-rectifying member unit according to claim 1, wherein each of said outer platform piece and said inner platform piece has connecting step portions at both ends, and said step portions of the adjacent units have shapes complementary to each other.

4. The flow-rectifying member unit according to claim 1, wherein said core is constituted by a laminate of fiber-reinforced prepregs or a light metal.

5. The flow-rectifying member unit according to claim 1, wherein said core is constituted by a laminate of fiber-reinforced prepregs, and said flanges are formed by bending both end portions of a laminate of said fiber-reinforced prepregs.

6. The flow-rectifying member unit according to claim 5, wherein said flanges are in a shape obtained by dividing both end portions of a laminate of said fiber-reinforced prepregs to two and bending them in a T shape, whereby said core is substantially in an I shape.

7. The flow-rectifying member unit according to claim 5, wherein said flanges are in a shape obtained by bending both end portions of a laminate of said fiber-reinforced prepregs in the same direction, whereby said core is substantially in a C shape.

8. The flow-rectifying member unit according to claim 4, wherein said fiber-reinforced prepregs are constituted by carbon-fiber-reinforced polyetheretherketone or a carbon-fiber-reinforced epoxy resin.

9. The flow-rectifying member unit according to claim 4, wherein said light metal is an aluminum alloy or a magnesium alloy.

10. A flow-rectifying member comprising a plurality of vanes, an outer platform and an inner platform for having a flow-rectifying function to a fluid flowing thereinto, which is integrally constituted by annularly connecting a plurality of flow-rectifying member units each having an integral structure comprising a vane, an outer platform piece and an inner platform piece, with the adjacent outer platform pieces connected to each other, and with the adjacent inner platform pieces connected to each other; each flow-rectifying member unit comprising (a) a core comprising a web constituting said vane, and flanges integrally connected to both ends of said web for constituting said outer platform piece and said inner platform piece, and (b) a skin layer covering a surface of said core; and said skin layer being made of a rubber or a thermosetting resin having rubber elasticity.

11. The flow-rectifying member according to claim 10, wherein the adjacent outer platform pieces are overlapping each other via connecting step portions, and the adjacent inner platform pieces are overlapping each other via connecting step portions.

12. The flow-rectifying member according to claim 10, wherein said outer and inner platforms are fixed by outer and inner circular support members and outer and inner fixing members, respectively.

13. The flow-rectifying member according to claim 12, wherein each of said outer, circular support member and said inner circular support member comprises a receiving portion having a width equal to or slightly smaller than the thickness of one end portion of each of said outer platform and said inner platform, whereby one end portion of each of said outer platform and said inner platform is press-fitted into the receiving portion of each of said outer, circular support member and said inner circular support member.

14. The flow-rectifying member according to claim 10, wherein said outer platform and/or said inner platform has notches at one end, and said notches engage stoppers mounted onto said outer fixing member and/or said inner fixing member.

15. The flow-rectifying member according to claim 10, wherein said flow-rectifying member is a stator vane assembly of a gas turbine.

16. A method for producing a flow-rectifying member comprising a plurality of vanes, an outer platform and an inner platform, said method comprising the steps of (1) forming a core comprising a vane, an outer platform piece and an inner platform piece by integrally connecting flanges to both ends of a web constituting said vane, and integrally molding a skin layer made of a rubber or a thermosetting resin having rubber elasticity to a surface of said core, thereby forming a flow-rectifying member unit; (2) connecting the outer platform pieces of the adjacent units to each other, and connecting inner platform pieces of the adjacent units to each other, thereby forming an annular temporary assembly; (3) mounting the outer and inner platforms of said temporary assembly onto outer and inner circular support members, respectively; and (4) fixing outer and inner fixing members respectively to said outer and inner circular support members, thereby fixing said temporary assembly to said outer and inner fixing members.

17. The method for producing a flow-rectifying member according to claim 16, which uses a thermosetting urethane rubber as said rubber or said thermosetting resin having rubber elasticity.

18. The method for producing a flow-rectifying member according to claim 16, wherein said outer and inner platform pieces respectively have connecting step portions at both ends, said step portions being overlapped with step portions of the adjacent units having complementary shapes, whereby said outer platform pieces are connected to each other, and said inner platform pieces are connected to each other, both by an elastic function of said rubber or said thermosetting resin having rubber elasticity.

19. The method for producing a flow-rectifying member according to claim 16, wherein each of said outer and inner circular support members has a receiving portion having a width equal to or slightly smaller than the thickness of one end portion of each of said outer and inner platforms, and one end portion of each of said outer platform and said inner platform is mounted by press fit to a receiving portion of each of said outer and inner circular support members.

20. The method for producing a flow-rectifying member according to claim 16, wherein said outer, circular support member has a receiving portion on an inner surface, to which the outer platform of said temporary assembly can be mounted.

21. The method for producing a flow-rectifying member according to claim 16, wherein said outer fixing member and/or said inner fixing member is annular and has stoppers projecting from one surface thereof, and wherein said stoppers are caused to engage notches of said outer platform and/or said inner platform of said temporary assembly to fix said temporary assembly at a predetermined position.

22. The method for producing a flow-rectifying member according to claim 16, wherein said core is constituted by a laminate of fiber-reinforced prepregs or a light metal.

23. The method for producing a flow-rectifying member according to claim 16, which uses carbon-fiber-reinforced polyetheretherketone or a carbon-fiber-reinforced epoxy resin as said core.

24. The method for producing a flow-rectifying member according to claim 16, which uses an aluminum alloy or a magnesium alloy as said core.

25. The method for producing a flow-rectifying member according to claim 16, wherein both end portions of a laminate of said core are bent to form the flanges of said core.

* * * * *